United States Patent
Guillemette et al.

(10) Patent No.: US 6,902,388 B2
(45) Date of Patent: Jun. 7, 2005

(54) PIVOTALLY ADJUSTABLE DIE

(75) Inventors: Glen Albert Guillemette, West Warwick, RI (US); James Prue, Griswold, CT (US)

(73) Assignee: Guill Tool and Engineering Co., Inc., West Warwick, RI (US)

( * ) Notice: Subject to any disclaimer, the term of this patent is extended or adjusted under 35 U.S.C. 154(b) by 99 days.

(21) Appl. No.: 10/443,499

(22) Filed: May 22, 2003

(65) Prior Publication Data

US 2003/0203067 A1 Oct. 30, 2003

Related U.S. Application Data

(63) Continuation-in-part of application No. 10/087,272, filed on Mar. 1, 2002, which is a continuation-in-part of application No. 09/189,286, filed on Nov. 10, 1998, now Pat. No. 6,382,944.

(51) Int. Cl.$^7$ .............................................. B29C 47/66
(52) U.S. Cl. ................... 425/190; 425/192 R; 425/381; 425/466; 425/468
(58) Field of Search ................................ 425/113, 190, 425/192 R, 381, 381.2, 466, 467, 468

(56) References Cited

U.S. PATENT DOCUMENTS 4,472,129 A    9/1984   Siard ........................... 425/381
5,286,183 A    2/1994   Tonsi et al. ................... 425/113
5,346,384 A    9/1994   Hegler et al. ................. 425/381
5,690,971 A   11/1997   Buluschek .................... 425/113
6,382,944 B1 * 5/2002   Guillemette ................. 425/113

FOREIGN PATENT DOCUMENTS

CA           635727         1/1962
GB           166915         7/1921

* cited by examiner

Primary Examiner—Joseph S. Del Sole
(74) Attorney, Agent, or Firm—Perman & Green, LLP

(57) ABSTRACT

A die module is constructed for an extrusion die which provides for the adjustment of the concentricity of the exit configuration by allowing relative movement of the die within the extrusion die assembly. The die is mounted on a die holder through a pair of mounting rings which fit into a recess in the die body. The rings are constructed with interface surfaces having a curvature with a center upstream. The interface surfaces form a seat within which the die holder is contained with mating surfaces engaging the interface surfaces to allow pivot motion about the center of curvature of the interface surfaces. The engaging surfaces are in the shape of a partial hemisphere to simulate a universal motion. Adjustment bolts are located in the extrusion die assembly downstream of the interface. Bolts, which secure the rings to the die holder, are constructed to provide a fixed spatial relation of the engaging surfaces.

11 Claims, 5 Drawing Sheets

PIVOTALLY ADJUSTABLE DIE

RELATED APPLICATION

This application is a continuation in part application of pending application Ser. No. 10/087,272, filed Mar. 1, 2002, which is a continuation in part application of application Ser. No. 09/189,286, filed Nov. 10, 1998. The latter application was issued on May 7, 2002 as U.S. Pat. No. 6,382,944. Priority dates of these application are claimed where appropriate. The disclosures of the above application are incorporated herein by reference.

BACKGROUND OF THE INVENTION

Extrusion dies are frequently used to provide a tubular coating to a wire or other product which provides a generally cylindrical substrate. A typical die assembly 101 for performing this function is shown in FIG. 1. The basic assembly 101 consists of a die body 102, a tip 103, a die holder 104, and a die 105 held in place by end caps 106 and 114. The tip 103 is mounted within an axial bore of the die body 101 and is itself constructed with an axial bore 107 having a downstream exit portion 108. In operation, a wire or other tubular product 116 is fed through bores 107 and 108 to exit axially at 115. An annular extrusion passage 109, surrounds exit 115, and is positioned to receive flowing plastic and apply it, in a tubular layer, to the product 116 at exit 115. In some instances air is blown through axial bore 107 to allow the formation of a hollow tubular part.

The die assembly 101 is an assembly of machined parts, each having its own manufacturing tolerance. These tolerances tend to multiply with the assembly of the components. It is therefore a difficult task to maintain the desired coaxial relationship between the product and the extruded layer to a particular tolerance. An adjustment mechanism is generally needed to insure concentricity of the die and pin so as to provide an even thickness of the applied layer. This is generally accomplished simply by mounting the die holder 104 for adjustment, along x and y coordinates. The adjustment may be actuated through adjusting screws 112. As shown in FIG. 1, the adjustment motion of the prior art is radially towards and away from the axis 117, of the assembly 101 as a torque is applied to an adjustment screw 112. This may require a significant adjustment torque because of the high thrust loads on the die holder during operation.

It is a purpose of this invention to provide a simple mechanism for adjusting the relative position of the die with respect to the pin to apply a consistently concentric layer of plastic about the circumference of the product, while reducing the torque required to adjust the position. It is another purpose of this invention to provide a module which incorporates the adjustment mechanism into an easily assembled component of the extrusion die assembly. It is also a purpose of this invention to provide a hemispherical adjustment interface that minimizes leakage.

SUMMARY OF THE INVENTION

The die assembly of this invention may be used as part of a cross head die which receives molten plastic from an extruder which enters the die passages in a direction that is transverse to the longitudinal axis of the assembly. The plastic must then be turned to flow downstream axially towards an annular tapered extrusion channel. It could also be used in association with an inline die configuration in which the plastic flows axially. In either case, the extrusion channel surrounds an axially extending passage through which a wire may be directed to receive a cylindrical layer from the extrusion passage. In some instances air is pumped through the axial passage to form a tubular product.

In order to apply a cylindrical layer of consistent radial depth or provide a tubular product of continuous thickness, the position of the die relative to the tip must be precise. Since it is difficult to maintain positioning accuracy within acceptable tolerances during assembly of the components, an adjustment mechanism is provided which allows the relative position of die and tip to be adjusted after assembly.

The die body of this invention is constructed with a recess at its downstream end to receive the die holder which supports the die in a fixed relation. The die holder is mounted within an upstream and a downstream mounting ring to form an adjustment module. The mounting rings are constructed having partial hemispherical surfaces which, in the assembled position, are concentric. The upstream hemispherical surface has a radius which is less than the downstream hemispherical surface. This results in the assembled rings forming a space, having opposing parallel hemispherical surfaces, which form a seat within which the die holder is engaged. The die holder is constructed with upstream and downstream partial hemispherical surfaces having the same curvatures as the respective surfaces within the seat formed by the mounting rings. These mating surfaces form an adjustment interface between the die holder and the die body. The center of curvature of these surfaces are located upstream of the die holder and provides a pivot point for movement of the die holder in the seat. The die holder and die holder seat, therefore, engage and operationally cooperate to provide an adjustment motion of the die holder within the die body that is a substantially universal motion.

To actuate the adjustment, adjusting screws are provided in the die body which engage the die holder at a position axially displaced downstream from the hemispherical engaged surfaces of the adjustment interface. This provides a mechanical advantage proportional to the distance that the adjustment screws are displaced from the fulcrum formed by the center of curvature of the surfaces which form the adjustment interface. Since the lever arm may be significant, this results in a reduction of the torque which must be exerted on the adjustment screws to correct the relative position of the die and tip. In this manner the die and tip may be accurately maintained in a concentric relation within significantly improved tolerances and reduces risk of leakage.

DESCRIPTION OF THE DRAWING

The invention of this application is described in more detail below with reference to the Drawing in which.

DESCRIPTION OF THE PREFERRED EMBODIMENT

Figure 1:
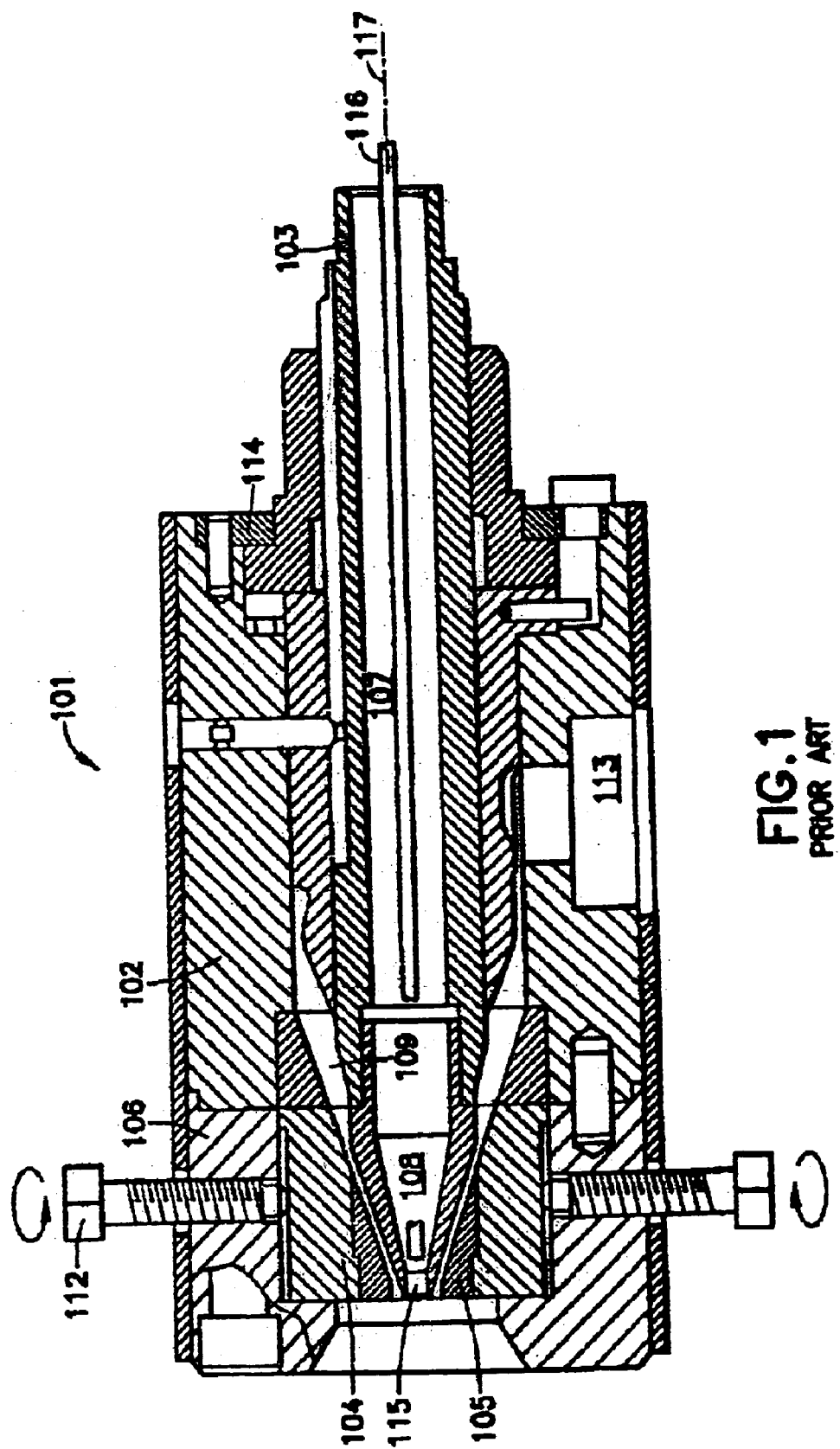
FIG. 1 is a sectional view of an extrusion die assembly showing the adjustment mechanism of prior art.
Figure 2:
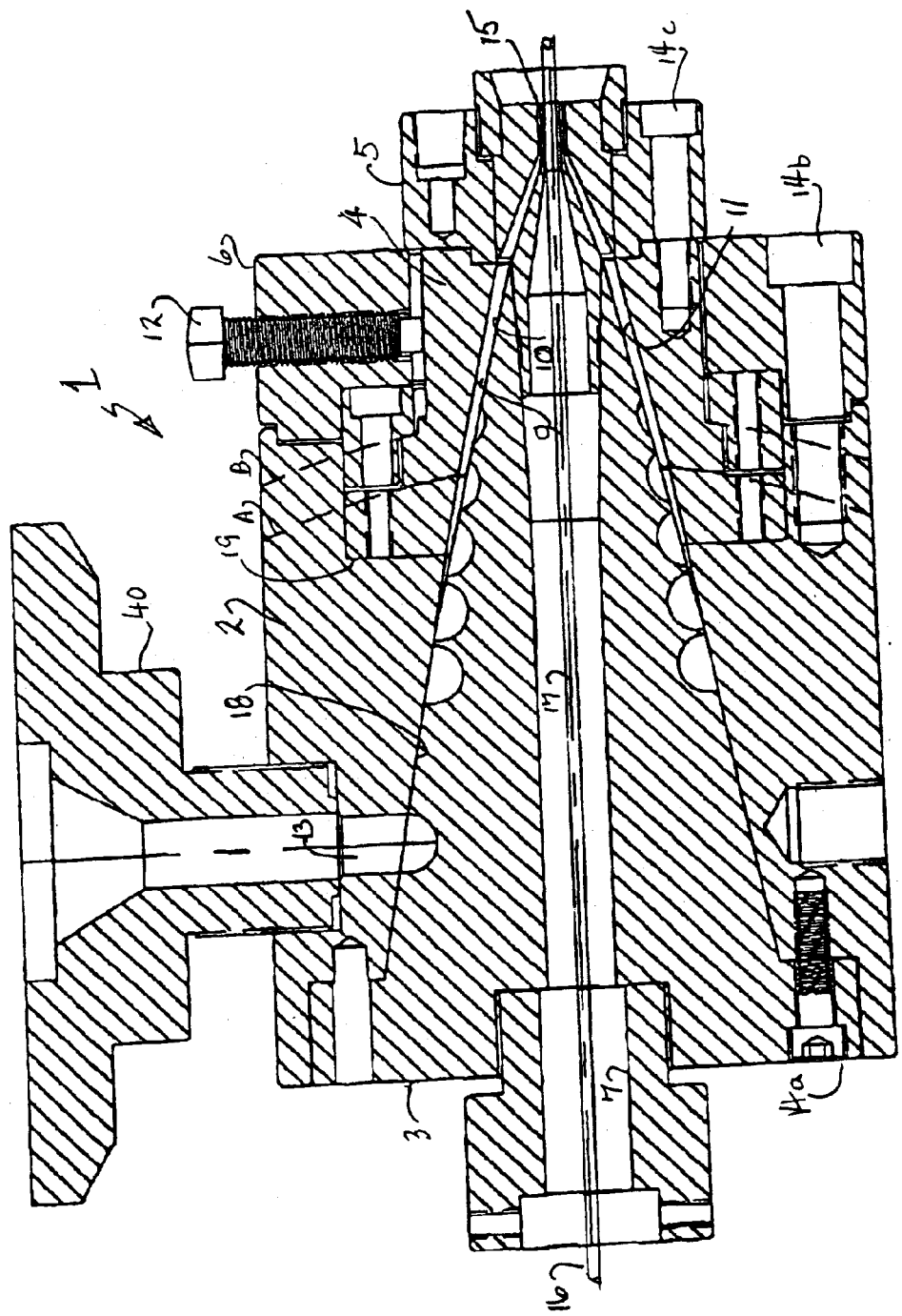
FIG. 2 is a sectional view of an extrusion die assembly showing the adjustment mechanism of this invention.

An extrusion die assembly 1, constructed in accordance with the subject invention, is shown in FIG. 2. The assembly 1 receives plastic from an extruder outlet 40 and supplies it to a tapered annular extrusion channel 9 where it is extruded and applied to a wire 16. The general function of the die head 1 is to receive plastic at upstream inlet 13 and distribute it to downstream outlet 15 in a flow pattern that is evenly dispersed about the extrusion channel 9.

Extrusion die assembly 1 consists of components, which are assembled in alignment with the axis 17 and cooperate to form an extrusion channel 9. Die body 2 is a generally cylindrical element having an internal axial bore 18 having openings at its upstream and downstream ends. A tip 3 is assembled within the bore 18 and extends to the outlet 15 at the downstream end of the die body 2. Bore 18 is constructed with a recess 19 concentric with the bore 18. Die holder 4 is assembled within recess 19 and is constructed with a surface 11, which is tapered inward towards the exit 15 of the extrusion channel 9. A similarly shaped surface 10 is constructed on the downstream end of the tip 3 in a manner which provides a clearance with the surface 11 to form an annular tapered channel 9 in the assembled position. A die 5 may be removably fixed by bolts 14c to the die holder 4 to form a die module and complete the extrusion channel 9 and form the exit 15.

Figure 3:
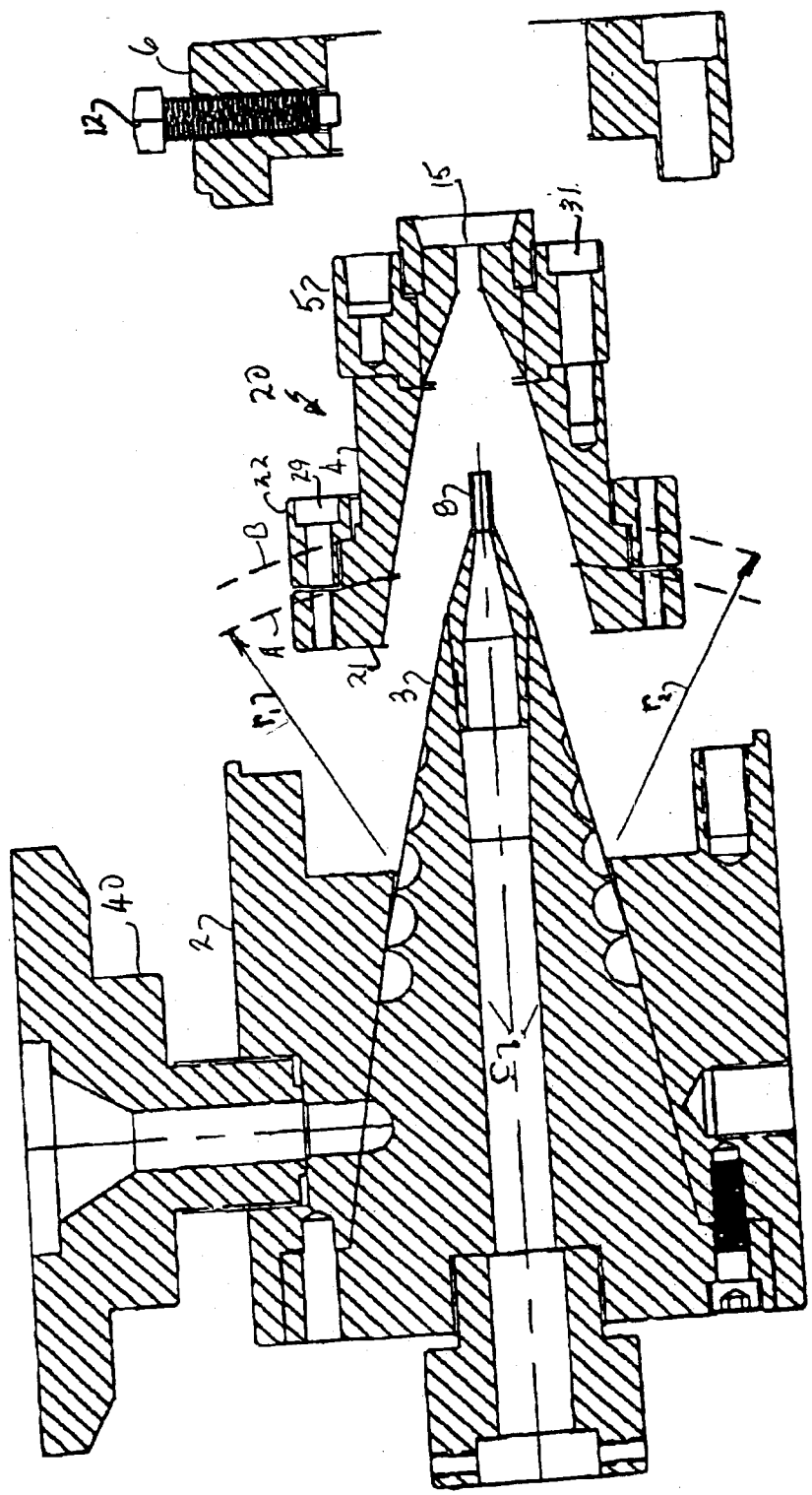
FIG. 3 is an exploded sectional view of the adjustment mechanism of this invention.
Figure 4:
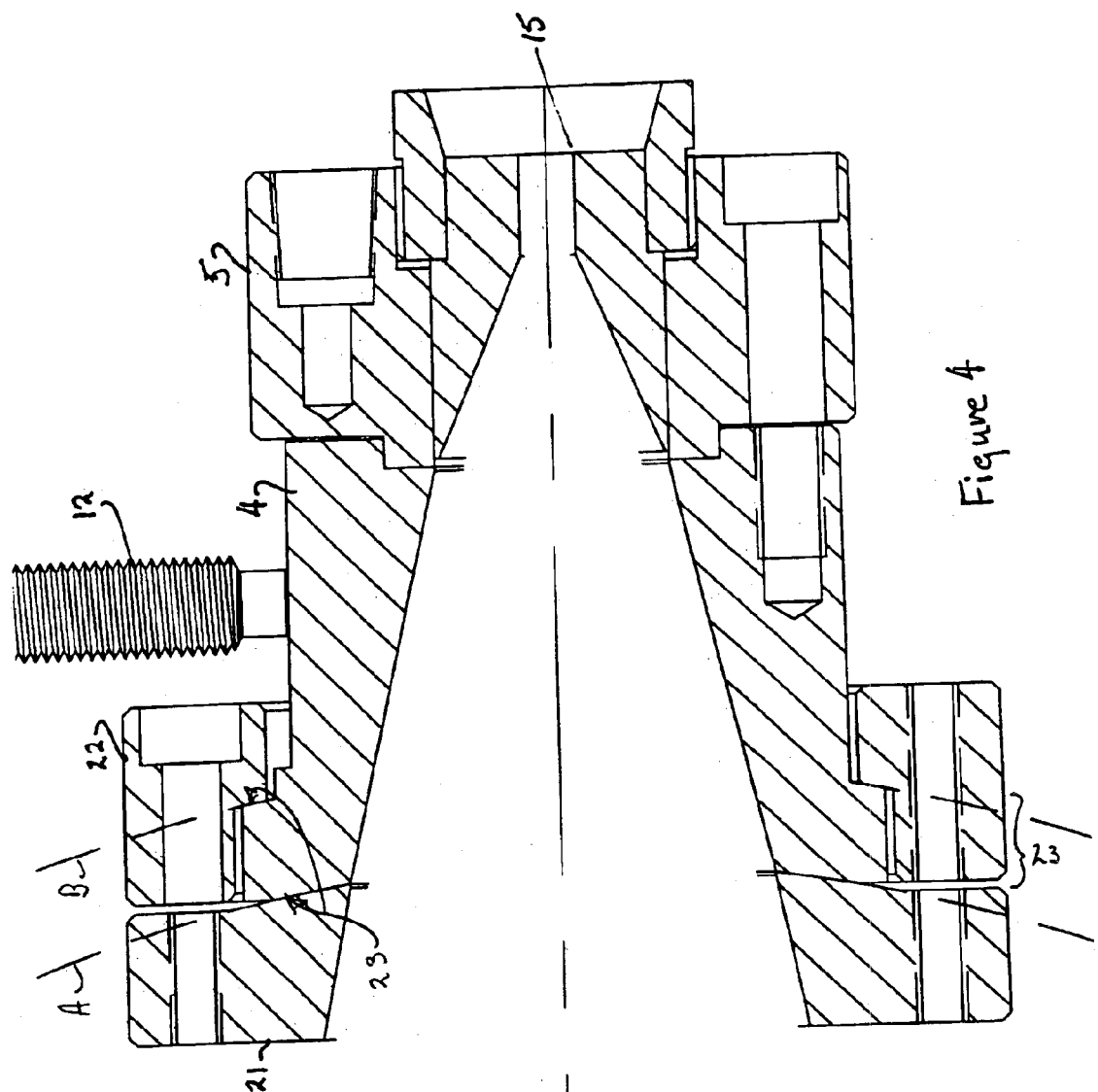
FIG. 4 is an enlarged sectional view of the die holder and mounting rings of this invention.

As illustrated in FIGS. 3 and 4, the exit 15 of the extrusion channel 9 is formed by the cooperation of the die 5 and the tip 3. The dimensions and configuration of the exit 15 are dependent on the relative position of these members. Tip 3 is constructed with an axial bore 7 having a downstream end 8 to provide a passage through which a tubular product, such as a wire 16, may be passed to receive a layer of plastic issuing from extrusion passage 9. In order to deposit a cylindrical layer of plastic on an elongated product in a uniform thickness, the die 5 and tip 3 must be positioned concentrically. The components of the die assembly may be secured in the assembled position by a cap 6 and bolts 14a. The cap 6 is attached to the die body 2 by means of threads or by bolts 14b, as shown in FIG. 2. Because of the sectional views, only 1 bolt is shown in each instance, but it should be understood that an array of at least three bolts are generally used, spaced symmetrically about the periphery of the element being secured.

Because of the accumulated tolerance errors within the assembly 1, it is necessary to provide a means by which the concentric position of the die 5 may be adjusted with respect to the pin 3. The overall motion required for adjustment is small. To provide this motion, an adjustment module 20 is constructed for the positioning of die body 2 within recess 19, as shown in FIG. 3. As described in more detail below, adjustment module 20 consists of die holder 4 and upstream and downstream mounting rings 21 and 22 respectively. Mounting rings 21, when assembled, form a seat 23 which provides an adjustment interface for engagement with mating surfaces constructed on die holder 4. The adjustment module 20 is held in place by a cap 6 and an array of bolts 14b.

Figure 5:
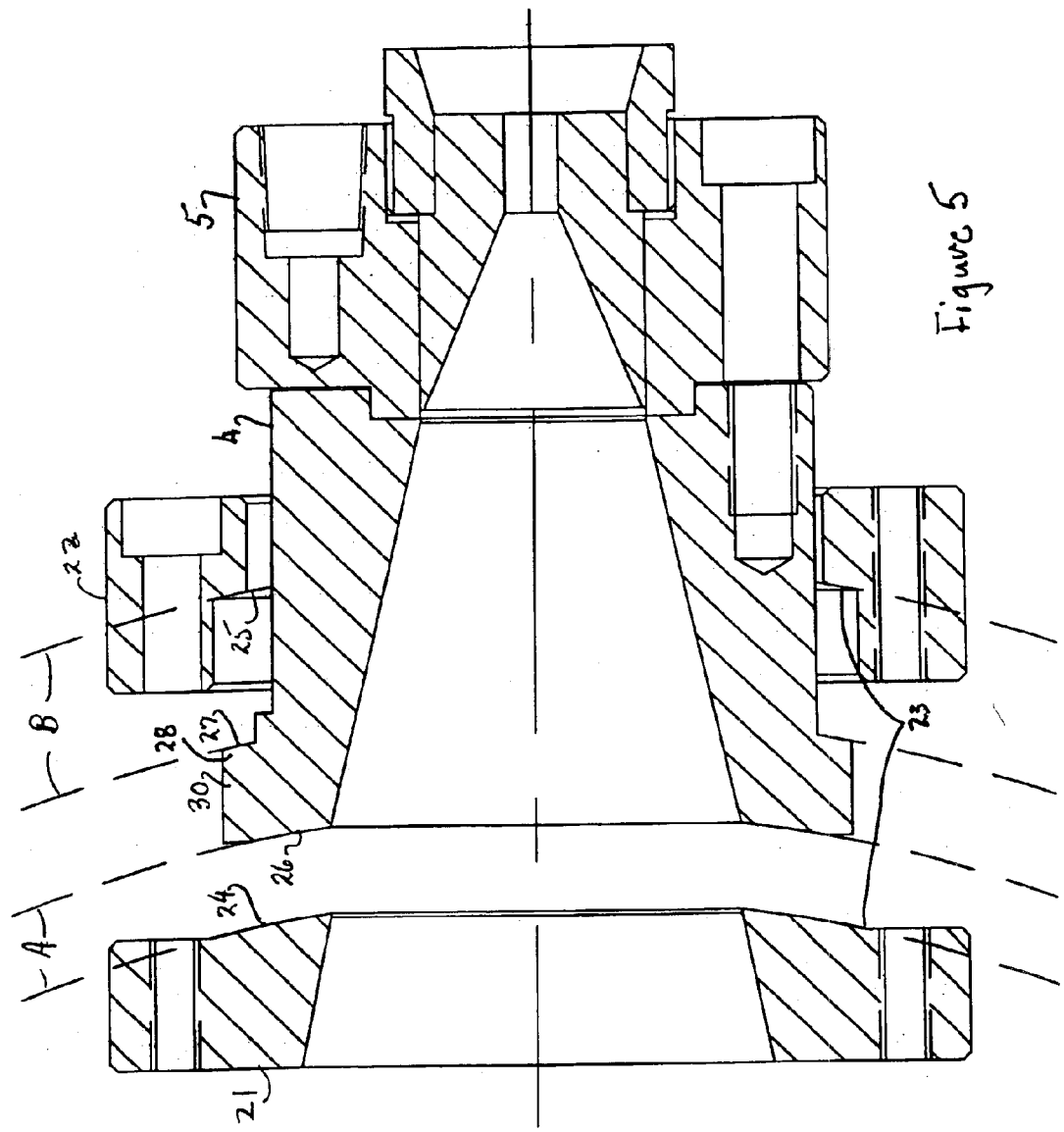
FIG. 5 is an enlarged sectional, partially exploded, view of the die holder and mounting rings of this invention.

Upstream mounting ring 21 is constructed with a hemispherical surface 24 having a radius of curvature $r_1$ from a center of curvature C (see FIG. 3). Downstream mounting ring 22 is constructed with a hemispherical surface 25 having a radius of curvature $r_2$ also extending from center of curvature C. Radius of curvature $r_2$ is greater than radius of curvature $r_1$. This means that in the assembled position, surfaces 24 and 25 are opposing and extend parallel to each other at a distance $r_2-r_1$. For illustration the lines of curvature of surfaces 24 and 25 are shown by extended dashed lines A and B. The seat or adjustment interface 23, therefore is defined between 2 hemispherical surfaces. Die holder 4 is constructed with an upstream surface 26 and a downstream surface 27 having similar curvatures respectively to surfaces 24 and 25 of mounting rings 21 and 22 (see FIG. 5). As shown in FIGS. 4 and 5, hemispherical surface 26 is constructed on the upstream face of the die holder 4. Downstream hemispherical surface 27 is formed on a downstream facing shoulder 28 extending radially outward from the die holder 4. It should be noted that these surfaces forming the adjustment interface 23 are formed as partial hemispheres, as the movement required for adjustment at the interface is smaller than that achieved at the exit 15. A large adjustment interface is therefore unnecessary. The die holder 4 is mounted within the seat 23 with its mating surfaces 26 and 27 engaging the adjustment interface surfaces 24 and 25 respectively. Rings 21 and 22 are bolted together with an array of bolts 29. Bolts 29 are constructed to engage threads on ring 21 and are limited in the depth and torque to which they can be tightened by appropriate means such as spacers, thread limits or the depth of the bore. This avoids overstressing the interface and binding the adjustment motion.

As best shown in 5, shoulder 28 is formed on an annular projection 30 formed in die holder 4. This allows the die holder 4 to be held between the rings 21 and 22 as the bolts 29 are tightened. As the compressive movement of the rings 21 and 22 together is limited by the action of the bolts 29, the exertion of excessive forces at the adjustment interface may be avoided. Again although only one bolt 29 is shown, an array of at least three bolts are used, spaced symmetrically about the downstream ring 22.

As shown in FIG. 4, die 5 is fixed by an array of bolts 31 to the die holder 4 and will move with die holder 4 as its position is adjusted. To apply a force for adjusting the position of die 5 with respect to pin 3, an array of adjustment bolts 12 are symmetrically arranged about the periphery of cap 6. Bolts 12 extend through cap 6 to operatively engage die holder 4 and exert a radial adjustment force on die holder 4. Since die holder 4 is mounted within the seat 23, it will pivot, under the action of adjustment bolts 12, about the center of curvature C of the adjustment interface surfaces 24–27. As can be observed from the figures, the lever arm extends from center C to the bolts 12 and is relatively long. Since adjustment center C is recessed upstream of the die 5, small increments of movement at the interface will result in significantly larger movements of the die 5. This allows a very accurate adjustment of the concentricity of the pin 3 within die 5.

It is observed that there is a clamping force exerted on the adjustment interface by virtue of the tightening of the bolts 14b of FIG. 2 into the die assembly body 2. The effect of this clamping force at the adjustment interface 23 is limited by the system of bolts 29, as described above. Bolts 29 have the additional function, therefore of maintaining the position of the mounting rings 21 and 21 with respect to the die holder 4 at the interface. This insures that a technician installing the die assembly cannot hinder the use of the adjustment mechanism by over tightening bolts 14b.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. An extrusion die assembly constructed to process a stream of flowing plastic from an upstream inlet to a downstream outlet, said inlet and said outlet being displaced longitudinally along an axis of said assembly, said extrusion die assembly comprising:

a die body having a first bore extending longitudinally from the upstream to the downstream end of the assembly and an inlet constructed in the die body for receiving flowing plastic, said first bore also being constructed having recess at the downstream end;

a tip element positioned within and coextensive with the first bore in alignment with the axis of the assembly, said tip element being constructed having second bore extending longitudinally from the upstream end to the downstream end of said tip element, to provide a passage for the processing of an elongated product;

a die module assembled within the recess of the first bore, operatively associated with the tip to form the downstream outlet;

a channel, formed by the cooperation of the die body, tip, and die, for distributing the flow of plastic from said inlet to said outlet;

an adjustment module constructed in the die assembly to provide relative motion between said die and said tip, said adjustment module further comprising:

a first mounting ring, having a first interface surface shaped as a portion of a hemisphere, said first interface surface having a first radius of curvature about a pivot center positioned upstream of said adjustment module;

a second mounting ring, having a second interface surface shaped as a portion of a hemisphere, said second interface surface having a second radius curvature about said pivot center, said second radius of curvature being greater than said first radius of curvature; a pair of mating interface surfaces constructed on said die module, said mating interface surfaces formed with matching curvatures for engaging said first and second interface surfaces;

wherein said interface surfaces are assembled form an adjustment interface which allows said die module to pivot about said pivot center, wherein, when assembled, said first and second hemispherical surfaces are arranged in parallel and spaced apart a distance equal to the difference in the first and second radii of curvatures and said pair of mating surfaces of said die module are positioned between said first and second interface surfaces; and an adjustment actuator positioned in said assembly to selectively exert a force on the die module at a position downstream of said adjustment interface to pivot said die module about said pivot center.

2. An extrusion die assembly constructed to process a stream of flowing plastic from an upstream inlet to a downstream outlet, said inlet and said outlet being displaced longitudinally along an axis of said assembly, said extrusion die assembly, as described in claim 1 wherein said die module comprises:

a die holder on which a die is attached in fixed relation with said die holder;

wherein said pair of mating interface surfaces are constructed on the die holder.

3. An extrusion die assembly constructed to process a stream of flowing plastic from an upstream inlet to downstream outlet, said inlet and said outlet being displaced longitudinally along an axis of said assembly, said extrusion die assembly, as described in claim 2, wherein said pair of mating interface surfaces further comprise:

a first mating interface surface constructed on an upstream facing end of said die holder; and a second mating interface surface constructed on downstream facing shoulder extending outward from said die holder.

4. An extrusion die assembly constructed to process a stream of flowing plastic from an upstream inlet to a downstream outlet, said inlet and said outlet being displaced longitudinally along an axis of said assembly, said extrusion die assembly, as described in claim 1, wherein said first and second mounting rings are secured in an assembled position in engagement with said pair of mating interfaces of said die module by means of an array of bolts, said bolts constructed to provide a fixed spatial relation between said interface surfaces to prevent binding of relative movement between the interfaces.

5. An extrusion die assembly constructed to process a stream of flowing plastic from an upstream inlet to a downstream outlet, said inlet and said outlet being displaced longitudinally along an axis said assembly, said extrusion die assembly, as described in claim 4, wherein said die module is secured to said die body by a cap which is attached to said die body by an array of axially extending bolts symmetrically arranged on said cap and said adjustment actuator comprises an array of radially extending bolts symmetrically arranged on said cap and extending through said cap to engage the die module.

6. An adjustment module for supporting a die within an extrusion die assembly having a mechanism for adjusting the relative position of the die at the exit of the extrusion die assembly, said adjustment module comprising:

a first mounting ring, having a first interface surface shaped as a portion of a hemisphere, said first interface surface having a first radius of curvature about a pivot center positioned upstream of said adjustment mechanism;

a second mounting ring, having a second interface surface shaped as a portion of a hemisphere, said second interface surface having a second radius of curvature about said pivot center, said second radius of curvature being greater than said first radius of curvature;

a pair of mating interface surfaces constructed on said adjustment module, said mating interface surfaces formed with matching curvatures for engaging said first and second interface surfaces of said mounting rings;

wherein said interface surfaces are assembled to form an adjustment interface which allows said adjustment module to pivot about said pivot center, wherein, when assembled, said first and second hemispherical surfaces are arranged in parallel and spaced apart a distance equal to the difference in the first and second radii of curvatures and said pair of mating surfaces of said adjustment module are positioned between said first and second interface surfaces.

7. An adjustment module for supporting a die within an extrusion die assembly having a mechanism for adjusting the relative position of the die at the exit of the extrusion die assembly, said adjustment module, as described in claim 6, further comprising an adjustment actuator positioned in said extrusion die assembly to selectively exert a force on the die module at a position downstream of said adjustment interface to pivot said adjustment module about said pivot center.

8. An adjustment module for supporting a die within an extrusion die assembly having a mechanism for adjusting the relative position of the die at the exit of the extrusion die assembly, said adjustment module, as described in claim 6, further comprising:

a die holder on which a die is attached in a fixed relation with said die holder; and wherein said pair of mating interface surfaces are constructed on the die holder.

9. An adjustment module for supporting a die within an extrusion die assembly having a mechanism for adjusting the relative position of the die at the exit of the extrusion die assembly, said adjustment module, as described in claim 8, wherein said pair of mating interface surfaces further comprise:

a first mating interface surface constructed on an upstream facing end of said die holder; and a second mating interface surface constructed on a downstream facing shoulder extending outward from said die holder.

10. An adjustment module for supporting a die within an extrusion die assembly having a mechanism for adjusting the relative position of the die at the exit of the extrusion die assembly, said adjustment module, as described in claim 6, wherein said first and second mounting rings are secured in an assembled position in engagement with said pair of mating interfaces of said die module by means of an array of bolts, said bolts constructed to provide a fixed spatial relation between said interface surfaces to prevent binding of relative movement between the interfaces.

11. An adjustment module for supporting a die within an extrusion die assembly having a mechanism for adjusting the relative position of the die at the exit the extrusion die assembly, said adjustment module, as described in claim 6, wherein said adjustment module is secured to said die body by a cap which is attached to said die body by an array of axially extending bolts symmetrically arranged on said cap and said adjustment actuator comprises an array of radially extending bolts symmetrically arranged on said cap and extending through said cap to engage the adjustment module.

* * * * *